A. MARQUIS AND W. SPROTT.
COTTON TOPPER AND BOLL WEEVIL CATCHER.
APPLICATION FILED DEC. 6, 1917.

1,325,406.

Patented Dec. 16, 1919.
2 SHEETS—SHEET 1.

Inventors
Alex Marquis and
Willie Sprott,

By

Attorney

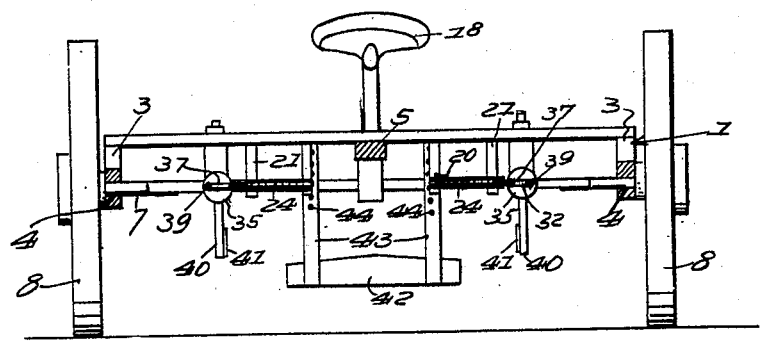

UNITED STATES PATENT OFFICE.

ALEX MARQUIS AND WILLIE SPROTT, OF HONDO, TEXAS.

COTTON-TOPPER AND BOLL-WEEVIL CATCHER.

1,325,406.  Specification of Letters Patent.  Patented Dec. 16, 1919.

Application filed December 6, 1917. Serial No. 205,771.

*To all whom it may concern:*

Be it known that we, ALEX MARQUIS and WILLIE SPROTT, citizens of the United States of America, residing at Hondo, in the county of Medina and State of Texas, have invented new and useful Improvements in Cotton-Toppers and Boll-Weevil Catchers, of which the following is a specification.

This invention has reference generally to improvements in harvesting machines and more particularly relates to a cotton topper and boll weevil catcher.

It is the principal aim and object of the present invention to provide a device of the above character designed for topping or cutting the tops of cotton plants after they have reached a predetermined height so as to prevent the plants from falling and consequently preventing the spreading of boll weevils or other insects, should the plants be infested with the same, to other plants.

It is an equally important object of this invention to provide a device of the above character designed for sweeping or brushing the cuttings into suitable receiving means carried by the device, said brushing means incidentally serving to sweep boll weevils or other insects from the plants into the receiving means.

As a further improvement this invention includes the provision of a receiving means of improved construction adjustably mounted on the frame and designed also to contain a solution capable of exterminating the insects which may be deposited into the pan when the device is in use.

The invention is clearly illustrated in the accompanying drawings, in which:—

Fig. 3 is an end elevation of the device;

Fig. 4 is a longitudinal central section of the invention;

Fig. 5 is a front elevation of a part of the topping means.

Fig. 6 is a section on the line 6—6 of Fig. 5.

Similar characters of reference are employed in all the above described views, to indicate corresponding parts.

Figure 1:
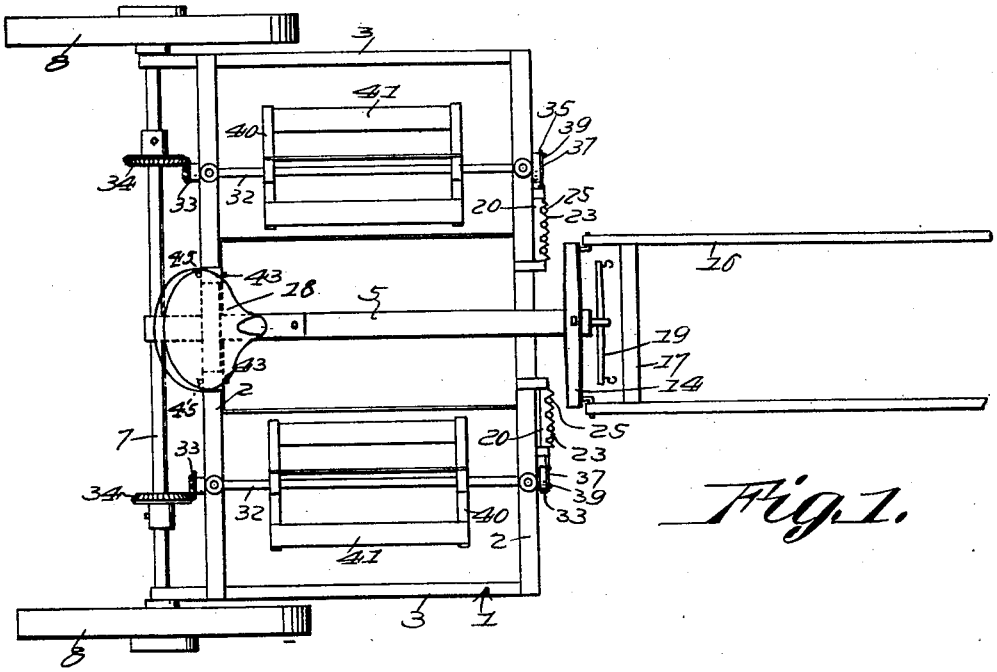
Figure 1 is a top plan view of the invention.
Figure 2:
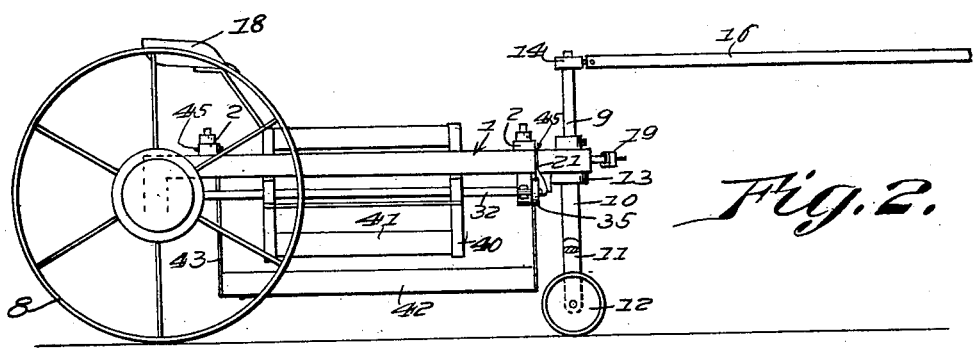
Fig. 2 is a side elevation thereof.

Referring now, more particularly, to the accompanying drawings, there is provided a frame 1 of a rectangular configuration and consisting of front and rear cross bars 2 connected at their ends by side bars 3 the rear portions of which are extended and provided with opposed alined openings 4. A longitudinal beam 5 is connected intermediate the ends and beneath the cross bars 2 and has its respective ends depending vertically beyond the cross bars. The rear extended portion is formed with an opening 6 which alines with the openings 4 while in these alined openings is journaled an axle 7. Rear wheels 8 are journaled on the projecting extremities of the axle for supporting the rear portion of the frame. A fork 9 is employed and consists of a shank 10 which is journaled through a vertical opening in the forward projecting portion of the beam 5. Spaced arms 11 depend from the shank, while journaled between the arms is a front wheel 12 which coöperates with the wheels 8 in supporting the frame. A collar 13 is rigidly connected to the shank and serves as a bearing for the beam. A cross bar 14 is formed intermediate its ends with a square opening 15 which is removably disposed about the squared upper end of the shank. Shafts 16 are pivotally connected to the cross bar 14 and in turn are made rigid with respect to each other by means of a connecting bar 17. A spring seat 18 is supported by the beam 5. A whiffle-tree 19 is operably connected to the forward projecting extremity of the beam and is adapted to accommodate the traces of a draft animal.

With a view toward providing the improved means for topping the cotton plants when they have reached a predetermined height, such as three feet, stationary cutting bars 20 are connected to the front crossbar upon opposite sides of the beam by suitable brackets 21. Each of these stationary cutting bars consisting of a plate bent back on itself to provide two spaced sections on the free edges of which there are formed the teeth 23 and between which the sickle bar 24 may slide. This sickle bar is formed on one edge with the teeth 25 which coöperate with the teeth 23 in topping the cotton plants when the bar 24 is reciprocated in the manner provided for by the construction herein shown. A lug 26 extends from one end of each sickle bar 24 for a purpose that will presently appear.

In order to reciprocate the sickle bars during the movement of the frame longitudinal shafts 32 are provided and journaled in alining bearings 31 secured to the forward and rear cross bars 2. Bevel gears 33 are connected to the rear ends of the shafts and mesh with other bevel gears 34 which in turn are mounted on the axle 7 so as to rotate therewith and consequently rotate the shafts toward each other. Disks 35 are mounted on the forward projecting extremities of the shafts 32 and each disk is formed with a radial series of openings 36. Pitman rods 37 are employed and have their outer ends pivoted, as at 38, to the adjacent lugs 26 on the slidable sickle bars 24. Pins 39 are loosely engaged through the opposite or inner end of each pitman rod and anchored in any one of the radially arranged openings 36 in the disk so as to consequently vary the strokes of the sliding sickle bars 24 during the rotation of the shaft. By this arrangement it is apparent that during forward movement of the machine rotary movement is transmitted to the longitudinal shafts 32 and by reason of the pitman rod connections between the shafts and the adjacent sickle bars 24 the latter will be reciprocated with respect to the stationary cutting bars 20 and by reason of the fact that the latter are mounted on the front cross bar of the frame the cotton plants which are disposed in the path of movement of the cutting means will be topped. It is to be understood, however, that only cotton plants that are over a certain height, such as three feet, will be topped.

For the purpose of removing the cuttings from the tops of the plants and for incidentally removing boll weevils or other insects which may infest cotton plants, improved beating paddles are provided. In reducing this feature of the invention to practice spaced spiders 40 are rigidly mounted on the shafts 32 between the front and rear crossbars while beating blades 41 are connected to the alined arms of the spiders. Owing to the meshing bevel gears 33 and 34 the shafts 32 will be rotated in a direction toward each other so that the blades will serve to brush the cuttings and also boll weevils toward the center of the frame.

Coöperating with the beating and brushing means is the improved receiving means which in the present instance may be said to consist of a rectangular pan 42 supported beneath the center of the frame in closely spaced relation to the ground through the instrumentality of hangers 43. These hangers are formed with openings 44 in any one of which are engaged suitable fasteners 45 which in turn are anchored to the adjacent front and rear cross bars so as to retain and support the pan in various positions with respect to the ground. A solution 46 may be placed in the pan to assure the extermination of the boll weevils that are brushed from the plants.

The mode of operation of the present invention may be reviewed as follows:

Assuming that the parts have been assembled in the manner described and as indicated in the drawings, on forward movement of the frame the axle 7 will be rotated and since the bevel gears 33 and 34 mesh with each other the longitudinal shafts 32 will be rotated toward each other simultaneously with the rotation of the axle. During this movement, owing to the eccentric connection of the pitman rods 37 with the disks 35 the sickle bars 24 will be reciprocated in the stationary cutting bars 20 so that the teeth 23 and 25 will coöperate with each other in topping the cotton plants which grow above three feet, it being understood that the frame is guided during this movement so that the cutting means will be positioned above adjacent rows of plants. By reason of the fact that the beating or brushing paddles are carried with the longitudinal shafts and rotate therewith the cuttings and incidentally any boll weevils will be removed from the plants and deposited in the receiving pan 42 suspended from the machine between the paddles.

If cotton plants have not reached the height of three feet it is apparent that the pins 39 may be disconnected, and the device used merely as a boll weevil catcher. It is necessary, however, to employ the cutting means on plants that are over three feet so that they may be topped when at such height since if they are allowed to grow much higher they will have a tendency to fall to the ground and allow any boll weevils thereon to spread to other plants.

It is believed that in view of the foregoing description, a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described the invention, what is claimed as new and desired to be secured by Letters Patent is:—

1. A device of the character described including a frame, a rear axle journaled in the frame, wheels mounted on the rear axle, spaced coöperative cutting means mounted on the front of the frame near the opposite sides thereof, means for operably connecting the cutting means with the rear axle to assure of operation of the cutting means simultaneously with the rear axle, opposed beating members operating simultaneously with the cutting means and positioned behind the adjacent cutting means for removing the cuttings from the plants, and means on the frame between the beating members for receiving the cuttings.

2. A device of the character described including a frame, coöperative cutting means mounted on the forward end thereof and in spaced relation to the ground, opposed beating means operating simultaneously with the cutting means for removing the cuttings from the plants, and receiving means carried by the frame and positioned between the beating means and into which the cuttings are deposited by the beating means.

3. A device of the character described including a frame, an axle journaled therein, wheels mounted on the extremities of the axle, coöperative cutters mounted on the forward end of the frame near the opposite sides thereof and one of each of which cutters is movable with respect to the other, longitudinally disposed shafts journaled in the frame and operably connected with the rear axle so as to rotate toward each other simultaneously with the rotation of the axle, means for operatively connecting the movable cutters with the adjacent shafts to assure of the reciprocation of the cutters during movement of the shafts, opposed combined beating and brushing paddles carried by the shafts and rotatable therewith for removing the cuttings from the plants and incidentally removing boll weevils from the plants, and a receiving pan suspended from the pan and positioned between the opposed beating and brushing paddles.

4. A device of the character described including a frame composed of side and end bars and a longitudinally disposed beam connected to the end bars and projecting therebeyond, an axle journaled in the side bars and the beam, wheels mounted on the respective ends of the axle, a fork composed of a shank with spaced arms depending therefrom, the fork being journaled vertically in the forward extremity of the beam, guide wheels journaled between the arms, cutting means carried by the front end bar of the frame and positioned on opposite sides of the beam, means for operably connecting the cutting means with the rear axle, opposed combined beating and brushing members mounted on the frame and operating simultaneously with the cutting means, and receiving means suspended from the frame and positioned between the beating and brushing members.

In testimony whereof we affix our signatures.

ALEX MARQUIS.
WILLIE SPROTT.